United States Patent [19]
Stavinoha et al.

[11] Patent Number: 4,927,878
[45] Date of Patent: May 22, 1990

[54] HEAT-CURABLE COMPOSITIONS COMPRISING A MIXTURE OF BIS(2-HYDROXYETHYL) DICYCLOPENTADIENE-CONTAINING POLYESTERS AND UNSATURATED POLYESTERS

[75] Inventors: Jerome L. Stavinoha; Anthony W. McCollum, both of Longview, Tex.

[73] Assignee: Eastman Kodak Company, Rochester, N.Y.

[21] Appl. No.: 262,373

[22] Filed: Oct. 25, 1988

Related U.S. Application Data

[62] Division of Ser. No. 101,473, Sep. 28, 1987, Pat. No. 4,801,629.

[51] Int. Cl.$^5$ .............................................. C08L 67/06
[52] U.S. Cl. ........................................ 525/44; 525/48; 428/482

[58] Field of Search ................. 427/385.5; 525/44, 48; 428/482

[56] References Cited

U.S. PATENT DOCUMENTS 3,242,112  3/1986  Renner ................................. 525/44
4,801,629  1/1989  Stavinoha ........................... 523/500

Primary Examiner—Patricia Short
Attorney, Agent, or Firm—Thomas R. Savitsky; Mark A. Montgomery; William P. Heath, Jr.

[57] ABSTRACT

Novel heat-curable compositions are obtained by combining a bis(2-hydroxyethyl)dicyclopentadiene containing polyester and an unsaturated polyester. These compositions can be cross-linked by heating at temperatures above 135° C., and do not require cross-linking agents or radical initiators. The compositions of the present invention are useful as coatings and adhesives having superior qualities.

1 Claim, No Drawings

HEAT-CURABLE COMPOSITIONS COMPRISING A MIXTURE OF BIS(2-HYDROXYETHYL) DICYCLOPENTADIENE-CONTAINING POLYESTERS AND UNSATURATED POLYESTERS

This is a divisional of application Ser. No. 101,473 filed on Sept. 28, 1987, now U.S. Pat. No. 4,801,629.

FIELD OF THE INVENTION

The invention relates to heat-curable compositions useful as coatings and adhesives More specifically, the invention relates to heat-curable compositions which comprise a mixture of bis(2-hydroxyethyl)dicyclopentadiene-containing polyesters and unsaturated polyesters.

BACKGROUND OF THE INVENTION

In most enamel coatings and adhesives, cross-linking is effected in one of two ways: either a reaction of cross-linking agents such as melamine-formaldehyde takes place with either the carboxyl or hydroxyl functionality of a polymer, or a free radical reaction occurs which produces a three-dimensional polymer network. The free radical reactions require use of a radical initiator in order to proceed. Furthermore, reactions such as these often involve the liberation of volatile organic by-products which necessitates expensive and cumbersome containment of these procuts. It would thus be desirable to obtain polymer coatings and adhesives of superior quality, yet which do not require cross-linking agents or radical initiators, and which do not liberate volatile organic by-products

SUMMARY OF THE INVENTION

It has been discovered that the combination of polyesters containing bis(2-hydroxyethyl)dicyclopentadiene and unsaturated polyesters results in an unexpected and unique cross-linking reaction which does not require cross-linking agents or radical initiators, and does not liberate volatile organic by-products. As a result of the cross-linking system of the reaction, novel three-dimensional cross-linked compositions are obtained when these polyesters are reacted at temperatures of 160°–200° C. The compositions are useful as coatings having excellent hardness, flexibility and solvent resistance, and as adhesives which have strong metal-metal bonding characteristics.

DETAILED DESCRIPTION OF THE INVENTION

The novel heat-curable compositions of the present invention are obtained by combining a film or fiber forming polyester containing bis(2-hydroxyethyl)-dicyclopentadiene (hereinafter BHDP) and comprising recurring units of the formula:

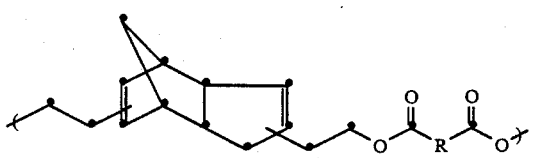

wherein R is an aliphatic or aromatic group, with an unsaturated polyester. These compositions are curable at temperatures above 135° C. and provide a resinous product useful as a coating or an adhesive. When the BHDP-containing polyesters are reacted with unsaturated polyesters at elevated temperatures, a novel and unexpected cross-linking reaction occurs to give a cured, three-dimensional polymer network.

Reacting the BHDP-polyesters with unsaturated polyesters at temperatures in the range of about 160° C. to about 200° C. is usually sufficient to form the cross-linked, three-dimensional product. At these reaction temperatures the BHDP-polyester cracks to give the following cyclopentadiene appendages:

and

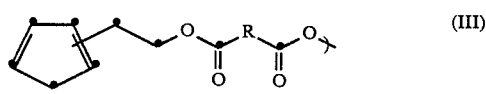

The dienes then react with the unsaturated polyester having the formula represented as:

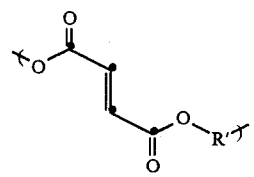

wherein R' represents a straight or branched chain aliphatic group of 2 to 12 carbon atoms, an aromatic group of 6 to 12 carbon atoms, or a group of the formula:

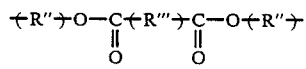

wherein each R" is, independently, a straight or branched chain aliphatic group of 2 to 12 carbon atoms and R''' is a straight or branched aliphatic group of 0 to 12 carbon atoms. Preferred R, groups are methylene; bismethylene; trimethylene; tetramethylene; ortho-, meta- or para-phenylene; methylphenylene; ethylphenylene; and the like A Diels-Alder reaction occurs forming a product schematically indicated as:

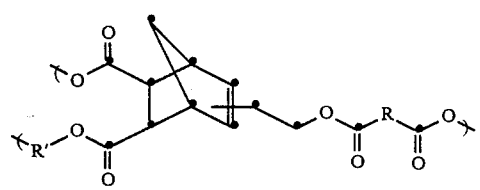

A secondary cross-linking reaction also occurs under the curing conditions. Radical intermediates are generated in the air oxidation of the dicyclopentadiene moiety. These radicals react with either the maleate double bond or those present in other dicyclopentadiene units, thus building a three-dimensional cross-linked network. The above reaction can be carried out in any reaction medium wherein the two polyesters can be combined and heated, preferably at temperatures from 160° to 200° C., for a time sufficient to substantially complete the reaction. The time needed will depend upon the precise nature of the reactive materials. If desired, a reaction catalyst, such as dibutyltin oxide, can be added to improve the speed of the radical reaction.

The relative amounts of the polyesters used in the above reaction can vary considerably. The amount BHDP-containing polyester used can range from about 20% to about 90% by weight of the total composition, and the amount of unsaturated polyester can range from about 80% to about 10% by weight of the composition. It is preferred that the amount of the BHDP-containing polyester range from 40% to 60% by weight of the composition, and that the amount of the unsaturated polyester range from 60% to 40%.

The BHDP-containing polyester can be prepared by polymerization of BHDP in any suitable fashion which gives the compound of Formula I above A process for preparing BHDP has been reported previously by Schroder et al., *J. Prakt. Chem.* 315;958(1973). The R group in the BHDP-containing polyester of Formula I above can comprise any non-interfering aliphatic or aromatic group, but one preferred R group comprises a branched or unbranched alkyl group having 1 to 10 carbon atoms. Examples of such groups include methylene, bismethylene, trimethylene, tetramethylene, etc. When this R group is tetramethylene, the resulting polyester in the above reaction will comprise recurring units of BHDP-adipate. Another preferred R group in this reaction comprises aromatic hydrocarbons of 6 to 2 carbon atoms. Examples of such groups include ortho, meta, or para-phenylene, methylphenylene, ethyl phenylene, etc. When the R group is p-phenylene, the resulting polyester is comprised of repeating units of BHDP-terephthalate.

Any unsaturated polyester can be used to combine with the BHDP-polyester and form the cross-linked product of the present invention. An unsaturated polyester suitable for use in the present invention can be formed as the condensation product of an unsaturated dibasic acid and a polyol, or of a dibasic acid and an unsaturated polyol. Illustrative of the unsaturated polyesters usable in the present invention are poly(2,2,4-trimethyl pentanediol maleate), poly(neopentyl glycol adipate maleate), poly(ethylene glycol maleate), poly(1,2-propylene glycol maleate), poly(1,3-propylene glycol maleate), and poly(1,4-butanediol maleate).

The compositions of the present invention can be made into coatings having excellent hardness, flexibility and solvent resistance. A heat-curable coating is prepared by dissolving a BHDP-polyester and an unsaturated polyester in an organic solvent. An example of a suitable solvent is a 70 to 30 percent solution of toluene and ethylene glycol monoethyl ether acetate. The percentage of solids in the coatings can range from about 10% to about 40%, with a 30% solids percentage preferred.

The relative amounts of the polyesters used to form the coating compositions can vary considerably, and ranges from about 30% BHDP-polyester/70% unsaturated polyester to about 90% BHDP-polyester/10% unsaturated polyester. Where BHDP-terephthalate and poly(neopentyl glycol adipate-maleate) are the polyesters used, an approximately 65% BHDP-terephthalate composition is found to have superior coating properties.

Coatings prepared by dissolving the two polyesters in suitable organic solvents are preferably spray applied onto an article, such as a solid metal surface, and cured by heating for a sufficient length of time. The curing temperature should be above be above 135° C., and is preferably in the range of 160°–200° C. For a 30% solids solution of the polyester reaction product, curing may be carried out by heating at about 170°–180° C. for approximately 20–30 minutes.

The coatings of the present invention are observed to have excellent pencil hardness, solvent resistance, and flexibility. These properties are the result of two types of curing Diels-Alder and radical. This has been shown in test coatings prepared wherein one of these two curing routes was suppressed. When a free radical inhibitor was employed, the radical cross-linking reaction was suppressed and there was a decrease in the solvent resistance and the hardness of the cured coating. Additionally, when curing occurs at a temperature below that necessary for the Diels Alder reaction, 135° C., the coatings are very brittle and have poor impact resistance and flexibility, even when free radical initiators are used.

The compositions of the present invention can be formed into strong adhesives, particularly useful in metal-to-metal bonding. The adhesives are formed by combining a BHDP-polyester with an unsaturated polyester at temperatures of less than 100° C. Metal-to-metal bonds can be formed by applying a small amount of this formulation (0.3–0.4g/sq.in. of metal) and then curing at a temperature above 135° C. Preferably, curing is carried out by heating the composition at a temperature of about 170°–180° C. for about 20–30 minutes. The adhesive mixtures can be applied either as a solid at room temperature or as a melt at 100° C. to 130° C. and then cured.

The proportions of each polyester used in the adhesive formulation can vary considerably, and range from about 20% BHDP-polyester/80% unsaturated polyester to about 90% BHDP-polyester/10% polyester.

The following examples are set forth as illustrative of the present invention and are presented to more clearly show the principles and practice of the invention.

EXAMPLE 1

Preparation of Poly(BHDP-Terephthalate)

Into a 4-necked, 1-liter flask fitted with a mechanical thermometer, $N_2$ ebulator, and steam jacketed column packed with Berl Saddles and topped with a Dean-Stark trap and condenser are charged dimethyl terephthalate (220 grams, 1.14 moles), BHDP (300 grams, 1.36 moles) and dibutyltin oxide (1.4 grams). The mixture is heated at 180°–190° C. for 5.5 hours. A conversion of 9% percent is effected based upon methanol distilled overhead. The solid yellow glass (viscosity 40,000 cp at 220° F.) has an average molecular weight of 2,060, an acid number of 1.2, and a hydroxyl number of 51.3.

EXAMPLE 2

Preparation of Poly(BHDP-Adipate)

Into the resin cook apparatus described in Example 1 are charged dimethyl adipate (200 grams, 1.15 moles), BHDP (302 grams, 1.37 moles), and dibutyltin oxide (1.0 gram). The mixture is heated at 180° C. for 4 hours. A conversion of 93 percent is obtained based upon the methanol taken overhead. The tacky polyester has an average molecular weight of 1,974, an acid number of 2.4, and a hydroxyl number of 50.0.

EXAMPLE 3

Preparation of Poly(Neopentyl Glycol Maleate Adipate)

The resin cook apparatus described in Example 1 is charged with neopentyl glycol (NPG) (299 grams, 2.88 moles), maleic anhydride (1965 grams, 2.0 moles), acipic acid (73 grams, 0.5 mole), and dibutyltin oxide (1.14 grams). The mixture is heated at 180°–190° C. for 15.5 hours. A conversion of 80 percent is obtained based on the water taken overhead. The polyester has an average molecular weight of 1,398, an acid number of 15.3, and a hydroxyl number of 77.1.

EXAMPLES 4 TO 9

Coatings from BHDP-Polyester/Unsaturated Polyester Reaction Products

Examples 4 through 9 are formulated by dissolving a BHDP-polyester and an unsaturated polyester in toluene/ethylene glycol monoethyl ether acetate (70/30). The percentages of each polyester in the reaction by weight is indicated in parenthesis in Table I. The formulations are spray applied as approximately 30 percent solids onto Bonderite 1000-treated cold rolled steel panels and cured for 20 minutes at 350° F. in a forced air oven. The coatings are evaluated 24 hours after curing. The results are given in Table I.

TABLE I

| Ex. | Coating System (Weight Percent) | Thick. mls. | Pencil Hard. | MEK** Double Rubs | Impact Resist. F/R (In.-Lb) | ⅛ In. Conical Mandrel Flex |
|---|---|---|---|---|---|---|
| 4 | BHDP-Terephthalate/ TMPD-*** Maleate (64/36) | 1.0 | 2H | 250+ | 160/60 | Pass |
| 5 | BHDP-Terephthalate/ BHDP-Adipate/ TMPD-Maleate (52/26/22) | 1.0 | H | 250+ | 160/60 | Pass |
| 6 | BHDP-Terephthalate/ BHDP-Adipate/ TMPD-Maleate (58/13/29) | 1.0 | 2H | 250+ | 160/160 | Pass |
| 7 | BHDP-Terephthalate/ NPG-Adipate-Maleate* (79/21) | 0.6 | 4H+ | 250+ | 160/160 | Pass |
| 8 | BHDP-Terephthalate/ NPG-Adipate-Maleate* (65/35) | 1.0 | 2H | 250+ | 160/160 | Pass |
| 9 | BHDP-Terephthalate/ NPG-Adipate-Maleate* (48/52) | 1.4 | 2H | 150 | 150/150 | Pass |

*Mole ratio maleate/adipate: 4/1.
**MEK is methyl ethyl ketone.
***TMPD is 2,2,4-trimethyl-1,3-pentanediol.

EXAMPLES 10 TO 15

Adhesives from BHDP-Polyester/Unsaturated Polyester Reaction Product

Examples 10 through 15 are formulated by blending the BHDP-polyester with an unsaturated polyester at temperatures less than 100° C. Metal-to-metal adhesive bonds for lap shear strengths are prepared by placing 0.3–0.4 gram of the formulation between 1 square inch of two 1-inch by 5-inch strips of sixteen gauge cold rolled stainless steel. The strips are held together with two pinch clamps (Thomas, No. 18). The adhesives are cured in a forced air dry oven for 30 minutes at 350° F. Shear strengths are meaured according to ASTM D1002. The T-peel tests are carried out according to ASTM 1876 with the following modifications: 9-inch by 1-inch coupons (twenty six gauge stainless steel) are employed with a 6-inch bond length. All samples are tested 48–72 hours after curing. The results of these tests ar illustrated in Table II.

TABLE II

| Ex. | Sample (Weight Percent) | Lap Shear, psi | T-Peel, pli |
|---|---|---|---|
| 10 | BHDP-terephthalate/TMPD-Maleate (42/58) | 2,500 | 6–8 |
| 11 | BHDP Adipate/TMPD Maleate (64/36) | 1,040 | — |
| 12 | BHDP Adipate/TMPD Maleate (46/54) | 1,300 | — |
| 13 | TMP-BHDP Adipate-terephthalate*/ TMPD maleate (77/23) | 1,000 | — |
| 14 | TMP-BHDP Adipate-terephthalate*/ TMPD-maleate (61/39) | 1,960 | — |
| 15 | NPG Adipate Maleate/BHDP-terephthalate (35/65) | 2,200 | 8–9 |

*TMP-BHDP adipate-terephthalate prepared by reacting dimethyl terephthalate (0.75 mole), dimethyl adipate (0.75 mole), trimethylolpropane (0.45 mole) at 180° C. for 2 hours, and reacting this product with BHDP (0.94 mole) for an additional 1.25 hours.

What is claimed is:
1. An article coated by a process which comprises:
   (a) providing a solution containing:
      (i) a film or fiber forming polyester comprising recurring units of the formula:

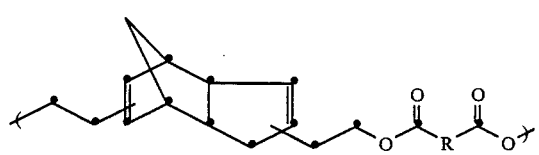

wherein R is an aliphatic or aromatic group; and
      (ii) an unsaturated polyester;
   (b) applying a coat of the solution onto an article;
   (c) removing the solvent; and
   (d) heating to cure the coating.

* * * * *